(12) United States Patent
Golman et al.

(10) Patent No.: US 11,715,457 B1
(45) Date of Patent: Aug. 1, 2023

(54) REAL TIME CORRECTION OF ACCENT IN SPEECH AUDIO SIGNALS

(71) Applicant: Intone Inc., New York, NY (US)

(72) Inventors: Andrei Golman, San Francisco, CA (US); Dmitrii Sadykov, Yerevan (AM)

(73) Assignee: Intone Inc., New York, NY (US)

( * ) Notice: Subject to any disclaimer, the term of this patent is extended or adjusted under 35 U.S.C. 154(b) by 0 days.

(21) Appl. No.: 18/083,727

(22) Filed: Dec. 19, 2022

Related U.S. Application Data

(60) Provisional application No. 63/297,901, filed on Jan. 10, 2022.

(51) Int. Cl.
| | | |
|---|---|---|
| *G10L 15/00* | (2013.01) | |
| *G10L 15/02* | (2006.01) | |
| *G10L 13/04* | (2013.01) | |
| *G10L 25/30* | (2013.01) | |
| *G10L 15/22* | (2006.01) | |
| *G10L 15/183* | (2013.01) | |
| *G10L 13/08* | (2013.01) | |
| *G10L 15/18* | (2013.01) | |

(52) U.S. Cl.
CPC .............. *G10L 15/02* (2013.01); *G10L 13/04* (2013.01); *G10L 15/22* (2013.01); *G10L 25/30* (2013.01); *G10L 13/08* (2013.01); *G10L 15/183* (2013.01); *G10L 15/1822* (2013.01); *G10L 2015/025* (2013.01)

(58) Field of Classification Search
CPC combination set(s) only.
See application file for complete search history.

*Primary Examiner* — Vu B Hang
(74) *Attorney, Agent, or Firm* — Georgiy L. Khayet

(57) ABSTRACT

Systems and methods for real-time correction of an accent in a speech audio signal are provided. A method includes dividing the speech audio signal into a stream of input chunks, an input chunk from the stream of input chunks including a pre-defined number of frames of the speech audio signal, extracting, by an acoustic features extraction module from the input chunk and a context associated with the input chunk, acoustic features, the context is a pre-determined number of the frames preceding the input chunk in the stream; extracting, by a linguistic features extraction module from the input chunk and the context, linguistic features, receiving a speaker embedding for a human speaker, providing the speaker embedding, the acoustic features, and the linguistic features to a synthesis module to generate a melspectrogram with a reduced accent, providing the melspectrogram to a vocoder to generate an output chunk of an output audio signal.

20 Claims, 12 Drawing Sheets

REAL TIME CORRECTION OF ACCENT IN SPEECH AUDIO SIGNALS

CROSS-REFERENCE TO RELATED APPLICATIONS

The present application claims priority of U.S. Provisional Patent Application No. 63/297,901 filed on Jan. 10, 2022, entitled "Real Time Correction of Accent in Speech Audio Signals," which is incorporated herein by reference in its entirety for all purposes.

TECHNICAL FIELD

This disclosure generally relates to audio processing. More particularly, this disclosure relates to systems and methods for real-time correction of accent in speech audio signals.

BACKGROUND

Audio conversations, such as audio chats, audio and video calls, and audio and video meetings are in wide use. One of the main problems encountered during an audio or video conversation is that speakers may possess strong accents that are difficult to understand by other participants. Existing solutions for correcting accent in audio signals are not very effective in real-time conversations.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

According to one example embodiment of the present disclosure, a method for real-time correction of an accent in a speech audio signal is provided. The method can be implemented by a computing device and includes dividing the speech audio signal into a stream of input chunks. The input chunk from the stream of input chunks can include a pre-defined number of frames of the speech audio signal. The method may also include extracting, by an acoustic features extraction module from the input chunk and a context associated with the input chunk, acoustic features. The method may also include extracting, by a linguistic features extraction module from the input chunk and the context, linguistic features with a reduced accent or accent-agnostic linguistic features. The method may also include receiving a speaker embedding for a human speaker. The method may also include generating an output chunk of an output audio signal based on the speaker embedding, the acoustic features, and the linguistic features. The generation of the output chunk may include providing the speaker embedding, the acoustic features, and the linguistic features to a synthesis module to generate a melspectrogram with the reduced accent and, providing the melspectrogram to a vocoder to generate an output chunk of an output audio signal.

The context may include a pre-determined number of the frames belonging to chunks preceding the input chunk in the stream of input chunks. The speaker embedding can be pretrained based on audio data including a recorded speech of a target speaker having a further accent. Alternatively, the speaker embedding can be generated based on the speech audio signal in real-time.

The speech audio signal can be recorded from the voice of a user by the computing device via an acoustic sensor. A delay between the first timestamp and the second timestamp can be between 40 milliseconds and 300 milliseconds, where the first timestamp corresponds to the time when the chunk of the speech audio signal is recorded and the second timestamp corresponds to the time when the output chunk is generated.

The linguistic features may include one of the following: phonetic posteriorgrams with a standardized phonetic dictionary or phonetic posteriorgrams with a data-driven phonetic library. The linguistic features extraction module may include a neural network trained based on audio data to output the linguistic features. The neural network can be trained using a loss function to reduce, in the linguistic features, contributions due to a further accent present in the audio data.

The acoustic features can include a pitch of the speech audio signal, energy of the speech audio signal, and value of a voice activity detector, the voice activity detector indicating absence of human voice in the speech audio signal or presence of human voice in the speech audio signal.

The synthesis module may include an encoder, a decoder, and a post-net module designed to improve output of the decoder. Generating the melspectrogram may include processing the linguistic features by the encoder to generate hidden features, combining the hidden features, the acoustic features, and the speaker embeddings to generate further features, and processing the further features by the decoder and the post-net module to generate the melspectrogram.

The method may also include, prior to dividing the speech audio signal, processing the speech audio signal by a digital signal processing module to adjust one or more characteristics of the speech audio signal to improve extraction of the linguistic features and the acoustic features.

The method may also include, prior to dividing the speech audio signal, processing the speech audio signal by a digital signal processing module to adjust loudness of the speech audio signal from a first level to a second level. The method may also include, after generating the output chunk of the output audio signal, processing the output chunk by the digital signal processing module, to adjust loudness of the output audio signal to the first level.

According to another embodiment, a system for real-time correction of an accent in a speech audio signal is provided. The system may include at least one processor and a memory storing processor-executable codes, wherein the processor can be configured to implement the operations of the above-mentioned method for real-time correction of an accent in a speech audio signal.

According to yet another aspect of the disclosure, there is provided a non-transitory processor-readable medium, which stores processor-readable instructions. When the processor-readable instructions are executed by a processor, they cause the processor to implement the above-mentioned method for real-time correction of an accent in a speech audio signal.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example and not limitation in the figures of the accompanying drawings, in which like references indicate similar elements.

DETAILED DESCRIPTION

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and operational changes can be made without departing from the scope of what is claimed. The following detailed description is, therefore, not to be taken in a limiting sense, and the scope is defined by the appended claims and their equivalents.

For purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to." The terms "can" and "may" shall mean "possibly be, but not limited to be."

This disclosure relates to methods and systems for real-time correction of accent in speech audio signals. Some embodiments of the present disclosure may be implemented in audio and video conversations to remove an accent in a speech audio signal captured from of a speaker uttering speech in a language that is not native to the speaker or a dialect of the same language that is different from the dialect spoken by other participants. Specifically, the speech audio signal can be analyzed in real time in chunks to extract acoustic features and linguistic features. The acoustic features and linguistic features can be then used to synthesize a melspectrogram lacking accent of the speaker. The melspectrogram can be used by a vocoder to generate an output audio signal lacking the accent.

In contrast to the existing solutions, embodiments of the present disclosure allow to reduce the delay between recording a chunk of the speech acoustic signal and outputting corresponding chunk of the output audio signal to 40-300 milliseconds.

Figure 1:
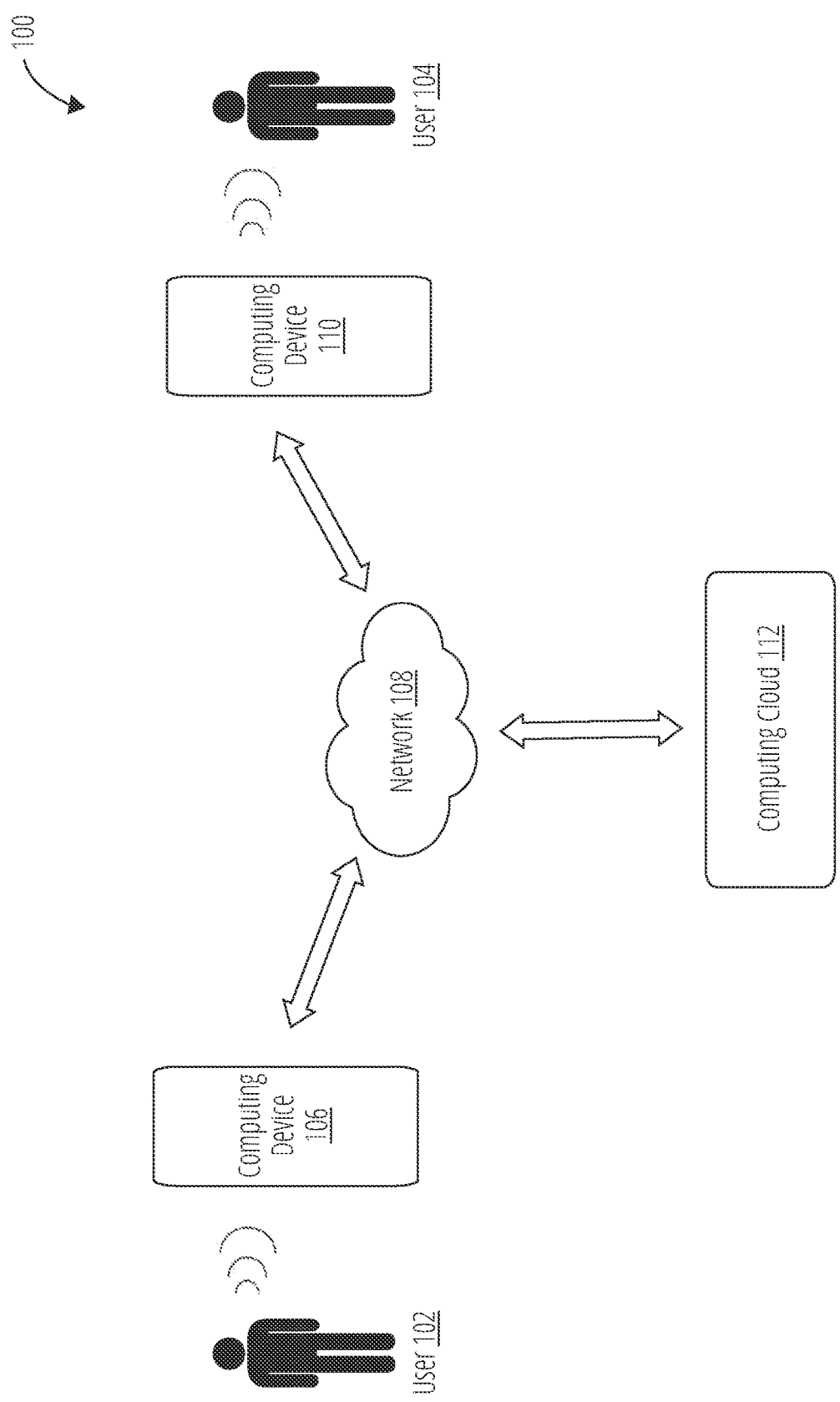
FIG. 1 shows an example environment, wherein a method for real-time correction of accent in speech audio signals can be practiced.

FIG. 1 shows an example environment 100, wherein a method for real-time correction of accent in speech audio signals can be practiced. It should be noted, however, that the environment 100 is just one example and is a simplified embodiment provided for illustrative purposes, and reasonable deviations of this embodiment are possible as will be evident to those skilled in the art.

As shown in FIG. 1, environment 100 may include a user 102, a user 104, a computing device 106, a computing device 110, a network 108, and a cloud-based computing resource 112 (also referred to as a computing cloud 112).

The computing device 106 and computing device 110 each may include a sound sensor, memory, processor, communication unit, and output device. The memory may be configured to store processor-readable (machine-readable) instructions or codes, which when performed by the processor, cause the computing device 106 (or computing device 110) to perform at least some steps of methods for real-time correction of accent in speech audio signals as described herein. The processor may perform floating point operations, complex operations, and other operations, including performing speech recognition and analysis based on ambient acoustic signals captured by sound sensor(s). The processors may include general purpose processors, video processors, audio processing systems, a central processing unit (CPU), a graphics processing unit (GPU), and so forth. The sound sensor(s) can include one or more microphones. The sound sensor(s) can be spaced a distance apart to allow the processor to perform a noise and/or echo reduction in received acoustic signals. The output device(s) may comprise one or more speaker(s), an earpiece of a headset, or a handset.

In various embodiments, the computing device 106 and computing device 110 can be configured to communicate with a network 108 such as the Internet, wide area network (WAN), local area network (LAN), cellular network, and so forth, to receive and send audio data.

The computing device 106 and computing device 110 can refer to a mobile device such as a mobile phone, smartphone, or tablet computer, a personal computer, laptop computer, netbook, set top box, television device, multimedia device, personal digital assistant, game console, entertainment system, infotainment system, vehicle computer, or any other computing device. The computing device 106 can be communicatively connected to the computing device 110 and the computing cloud 112 via network 150.

The network 108 can include any wired, wireless, or optical networks including, for example, the Internet, intranet, local area network (LAN), Personal Area Network (PAN), Wide Area Network (WAN), Virtual Private Network (VPN), cellular phone networks (e.g., Global System for Mobile (GSM) communications network, packet switching communications network, circuit switching communications network), Bluetooth™ radio, Ethernet network, an IEEE 602.11-based radio frequency network, a Frame Relay network, Internet Protocol (IP) communications network, or any other data communication network utilizing physical layers, link layer capability, or network layer to carry data packets, or any combinations of the above-listed data networks. In some embodiments, network 108 may include a corporate network, data center network, service provider network, mobile operator network, or any combinations thereof.

Computing cloud 112 can be shared by multiple users and be dynamically re-allocated based on demand. Computing cloud 112 can include one or more server farms and clusters including a collection of computer servers which can be co-located with network switches or routers.

According to one example embodiment, user 102 may communicate with user 104 through a voice call using a messenger or send voice messages via the messenger. The voice of the user 102 can be captured by the sound sensor of the computing device 106 to generate a speech audio signal. The user 102 may not be a native speaker of the language the user 102 speaks, so the speech audio signal may include an accent of the user 102. The speech audio signal can be further modified to remove or reduce the accent of the user 102 in the speech audio signal.

In one embodiment, the modification of the speech audio signal can be carried out by a processor of computing device 106. The modified speech audio signal can be sent, via the communication unit of the computing device 106, to the computing device 110. The computing device 110 may play back the modified speech audio signal via output device(s). Thus, user 104 may listen to the modified speech audio signal instead of the speech of the user 102.

In other embodiments, the speech audio signal can be sent to the computing cloud 112. In some embodiments, the speech audio signal can be sent to the computing cloud 112 using voice over internet protocol (VoIP). Computing cloud 112 can modify the speech audio signal to remove or correct the accent of the user 102 from the speech audio signal. Computing cloud 112 can send the modified speech audio signal to the computing device 110.

Figure 2:
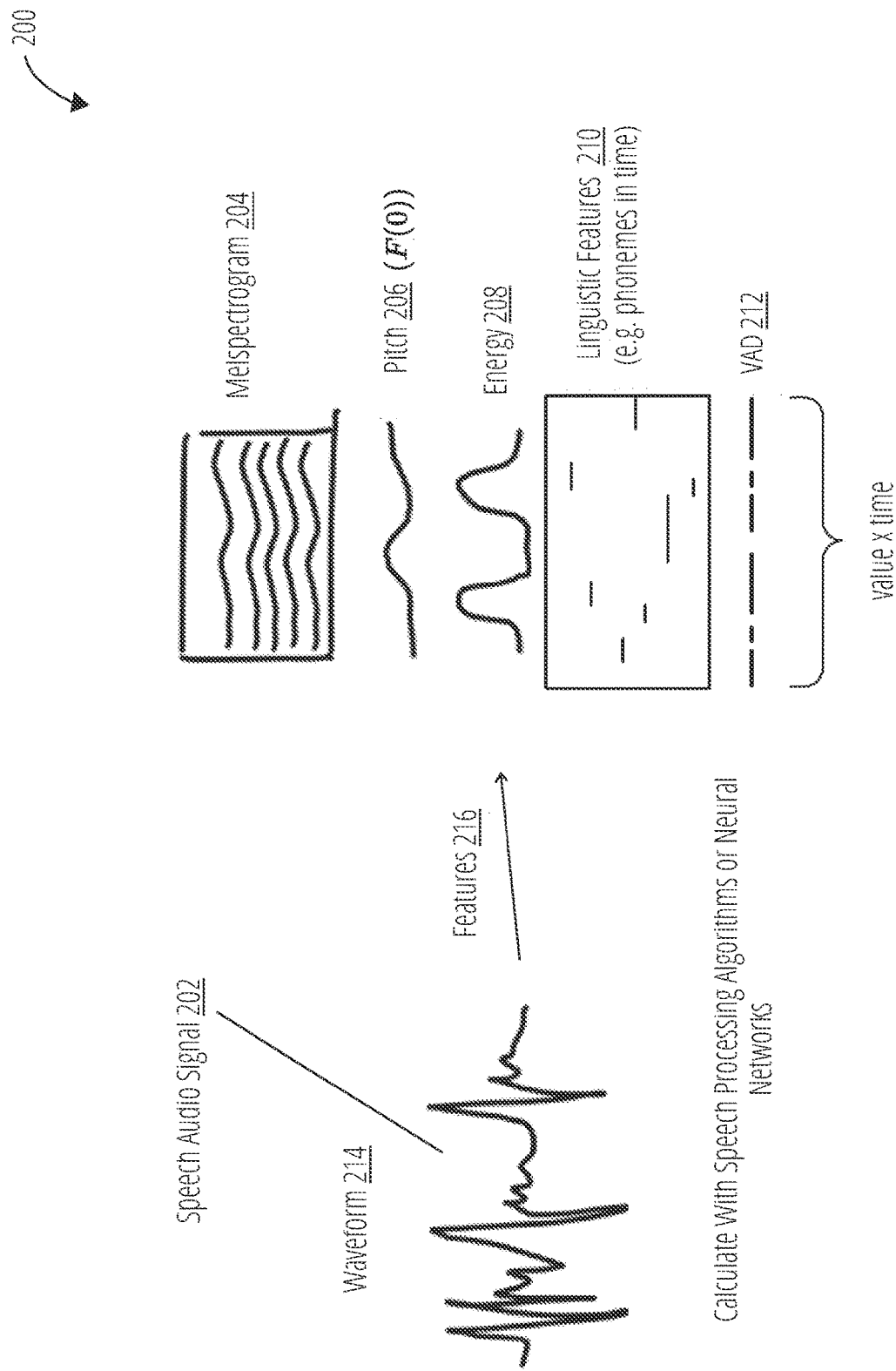
FIG. 2 is a schematic showing features that can be extracted from a speech audio signal, according to some example embodiments of the present disclosure.

FIG. 2 is a schematic showing features 216 that can be extracted from a speech audio signal 202, according to some example embodiments of the present disclosure. The speech audio signal 202 may include waveforms 214. The features 216 can be calculated per each time frame x. The features 216 may include acoustic features and linguistic features 210. The acoustic features may include pitch 206 (or main frequency (F0)), energy 208 (signal amplitude), and voice activity detection (VAD) 212. VAD 212 is a flag indicating the presence or absence of voice in the time frame.

Each of the features 216 is aligned with the others in time. Values of each feature are equidistant in time with respect to the values of the same feature obtained from the neighboring time frames. Accordingly, each of the features 216 is obtained from a chunk of speech audio signal 202 corresponding to an equal time period.

The melspectrogram 210 can be generated based on the acoustic features and linguistic features 210 as described herein.

Figure 3:
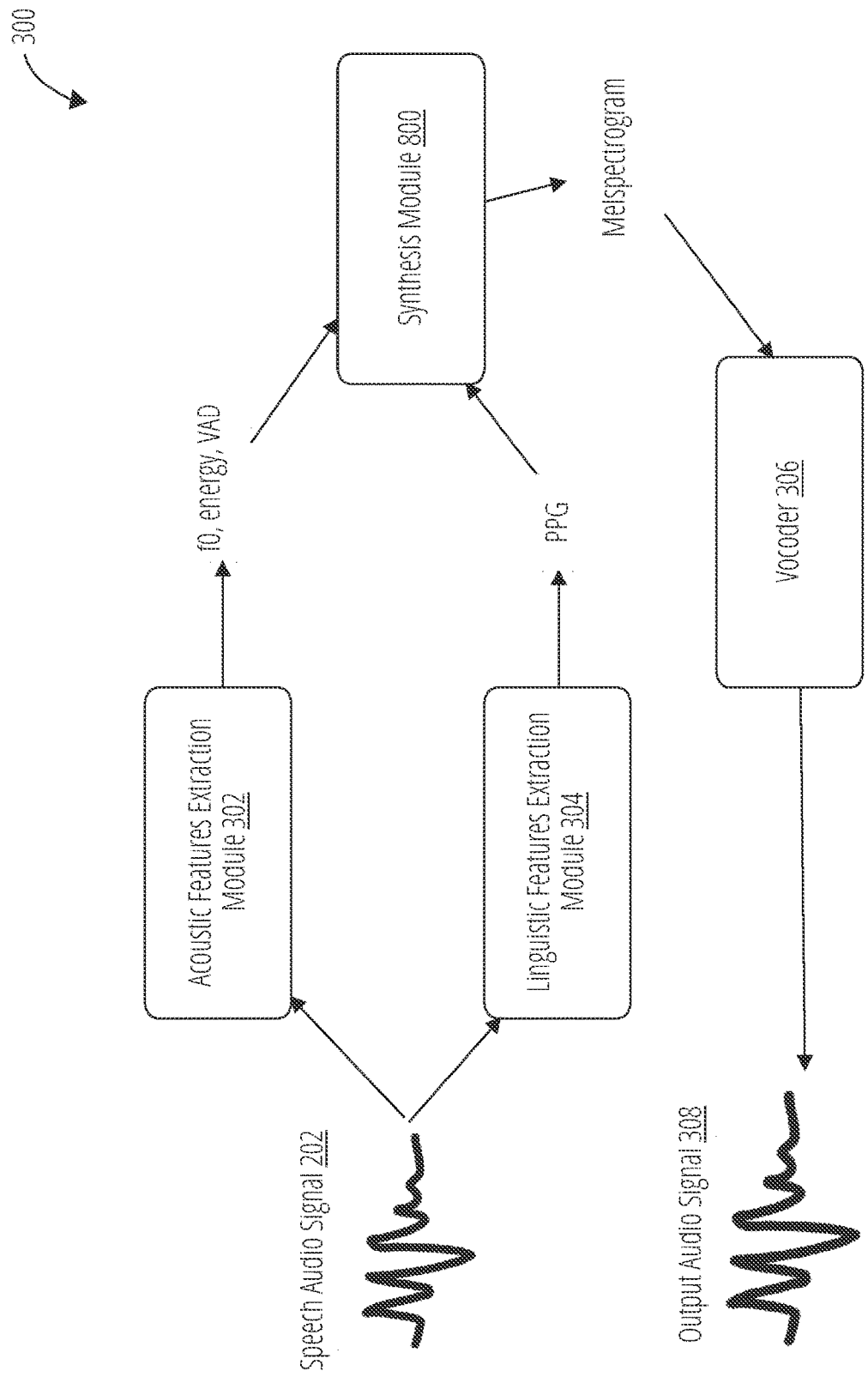
FIG. 3 is a block diagram showing a pipeline for real-time correction of an accent in speech audio signals, according to an example embodiment.

FIG. 3 is a block diagram showing a pipeline 300 for real-time correction of an accent in speech audio signals, according to an example embodiment. The pipeline 300 may include an acoustic features extraction module 302, a linguistic features extraction module 304, a synthesis module 800, and a vocoder 306.

The acoustic features extraction module 302 may extract, from a time frame of the speech audio signal 202, the acoustic features including pitch 206 (F0), energy 208, and VAD 212. These acoustic features can be obtained by algorithmic methods for signal processing or neural networks.

The linguistic features extraction module 304 may extract, from a time frame of the speech audio signal 202, linguistic features 210. In some embodiments, linguistic features 210 may include hidden features of an Automatic Speech Recognition (ASR) neural network with additional custom training and transformations or phonemes belonging to a phoneme set for a predetermined language. For example, the phoneme set may include ARPAbet phoneme set for English or classes (called pseudo-labels) of some clusterization algorithm over linguistic acoustic features of English speech data, like mel-spectrogram or hidden features of the ASR neural network. The phonemes can be obtained by a neural network trained to recognize and classify phonemes. In certain embodiments, the linguistic features 210 can be represented as Phonetic PosteriorGrams (PPGs). PPG can be defined as a distribution of the posterior probabilities of each phonetic class for each specific time frame of the speech audio signal 202. Even though embodiments of the present disclosure are described as utilizing PPGs, the present technology can be practiced with any linguistic features.

The acoustic features and linguistic features can be provided to the synthesis module 800. The synthesis module 800 may generate melspectrogram 204 corresponding to speech of the user 102 with removed or reduced accent. The melspectrogram 204 can be provided to the vocoder 306. The vocoder 306 may generate output audio signal 308.

Figure 4:
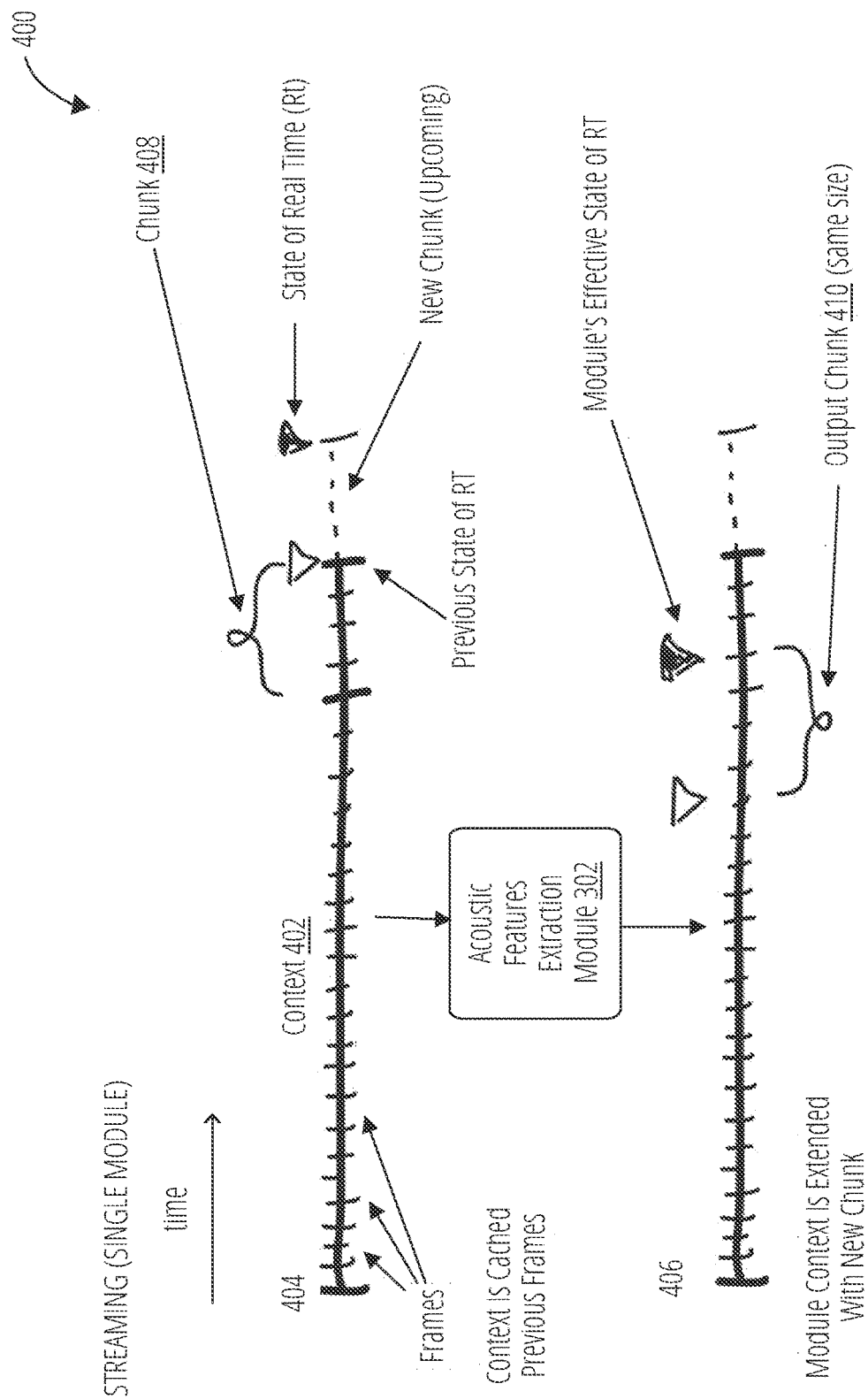
FIG. 4 is a schematic showing details of dividing a speech audio signal into chunks for forming input data to modules of the pipeline, according to an example embodiment.

FIG. 4 is a schematic 400 showing details of dividing a speech audio signal 202 into chunks for forming input data to modules of the pipeline 300. The speech audio signal 202 can be provided to the modules (for example acoustic features extraction module 302) as a stream 404 of chunks. Each chunk may include a pre-determined number of frames. Each of the frames is a portion of the speech audio signal 202 of a predetermined time interval size. In some embodiments, the length of each of the frame can be, for example, 11.6 milliseconds (ms).

An input to module 302 may include a chunk 408 of frames concatenated with a context 402. The context 402 may include a pre-determined number of frames of the speech audio signal 202 preceding the chunk 408. Context 402 can be stored in a cache of module 302 and continuously updated. Thus, at each state of real time, input of the modules can include the chunk 408 ended at the previous state of real time and the context 402 corresponding to the chunk.

The output of module 302 is stream 440. The stream 404 may include chunks of one of acoustic features (pitch 206 (F0), energy 208, or VAD 212. Output chunk 410 can be formed by cutting, from the output stream 406, a chunk that ends at an effective state of real time in module 302. The context 402 can be extended by chunk 408. The first chunk in the context 402 can be removed. Thus, the modified context 402 can be used for processing the next chunk from the stream 404. The output chunk 410 can be provided to the synthesis module 800 (shown in FIG. 3). Similarly, module 304 (shown in FIG. 3) may produce a stream of chunks of linguistic features. The chunks of linguistic features can also be provided to the synthesis module 800.

Overall, input of the synthesis module 800 includes a stream of chunks of linguistic features 225 (PPGs), a stream of chunks of values of pitch 206 (F0), a stream of chunks of values of energy 208, and a stream of chunks of values of VAD 212, all the streams being aligned with each other. The output of the synthesis module 800 module and, correspondently, the input of the vocoder 306, includes a stream of chunks of melspectrogram 204. Similarly, to module 302, each of the modules 304, 800, and 306 may have a cache to store a context including predetermined number of previous frames of the corresponding features. The above architecture of streaming chunks to every one of modules 302, 304, 800, and 306 can be applied recursively to internal submodules of these modules, such as neural network blocks and layers.

In further embodiments, the context can be also cached for submodules of the modules 302, 304, 800, and 306. For example, acoustic features extraction module 302 may include one or more of the following submodules: 1D convolution layer (Conv1d), attention layer, and variance predictors. Each of the submodules may include cache for storing the context of output of corresponding preceding submodule in the acoustic features extraction module 302. The preceding submodule may output a stream of chunks of internal features corresponding to stream 404. The input to the next submodule in module 302 may include the last output chunk produced by the preceding submodule and the context including a predetermined number of previous frames of chunks produced by the preceding submodule.

Caching context for inner submodules of modules 302, 304, 800, and 306 (outer modules) may allow to achieve same output quality for modules 302, 304, 800, and 306 between training stage and streaming (inference) stage because a future context of an outer module originates from future contexts of inner submodules. Every layer in sequential part of a neural network that implements one of the modules 302, 304, 800, and 306 can be part of the future context. The parts of the future context can be summed up to receive total a future context of the outer module. The total future context of the outer module can be split into the outer part (regulated with cache of the outer module) and inner part (regulated with inner submodules' caches). In some embodiments, only inner future context can be used in streaming. In other embodiments, partially inner further context and partially outer future context can be used in streaming.

Figure 5:
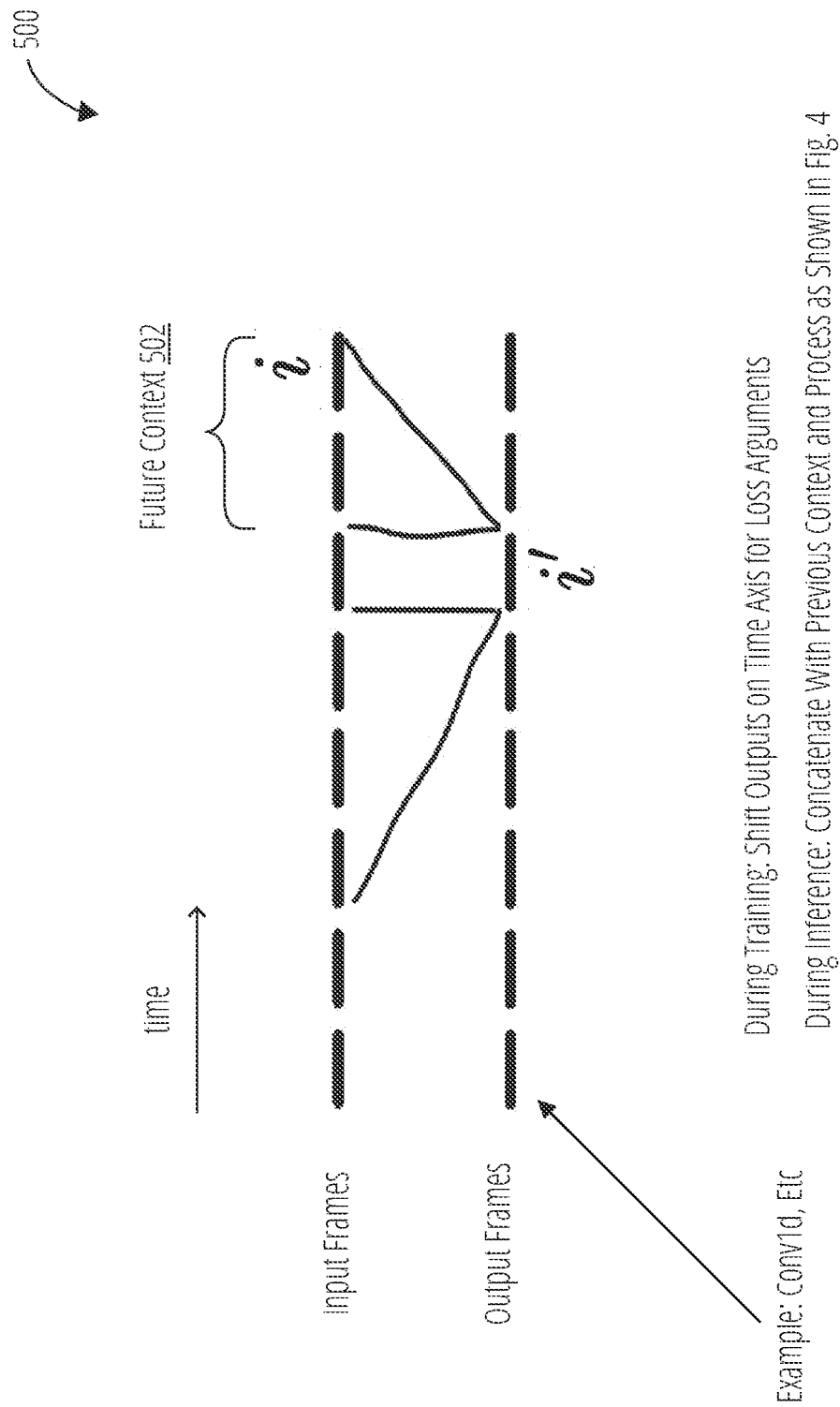
FIG. 5 is a schematic showing details of processing input frames during a training stage of submodules and modules of the pipeline, according to an example embodiment.

FIG. 5 is a schematic 500 showing details of processing input frames during the training stage of submodules and modules of the pipeline 300, according to an example embedment. FIG. 5 shows input frames and output frames for a minimal example of a neural network layer, which produces output shifted on the time axis parametrized by future context (also referred to as a shift). For example, the neural network layer may include cony1d, attention layer, conformer and other layers. During training, the output frames i' can be shifted for calculation of Loss sensitive to time location, which can teach the model (layer) to produce shifted output by the parameter of the future context. On inference stage (streaming) the input frames i can be concatenated with previous context, divided in chucks and processed as described in FIG. 4.

Figure 6:
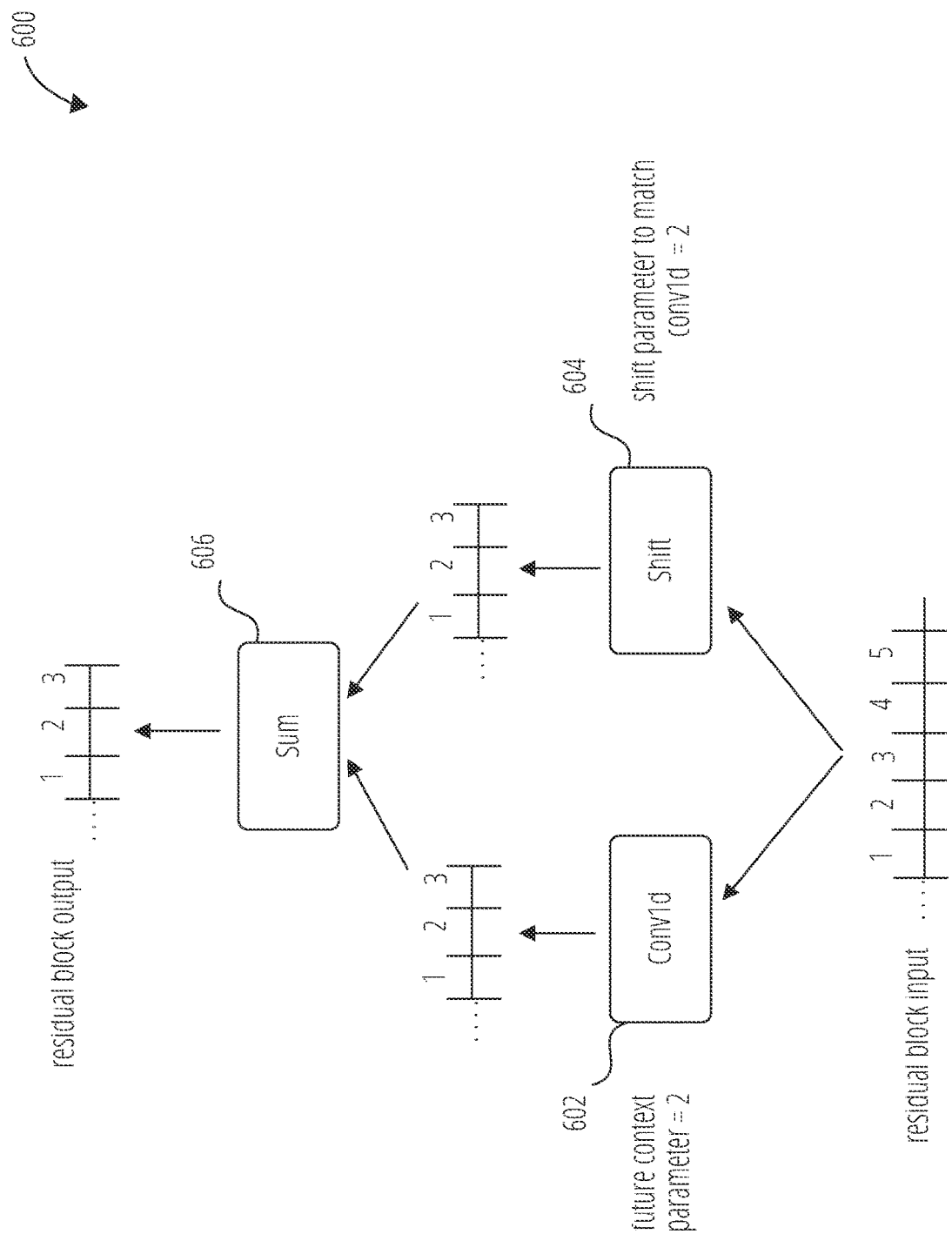
FIG. 6 is a schematic showing details of summation of a context in an example module 600, according to an example embodiment.

FIG. 6 is a schematic showing details of summation of a context in an example module 600, according to an example embedment. The module 600 may include parallel blocks, Conv1D 602 and Shift 604. The Conv1D 602 may use input frames 1, 2, 3 as context for input frames 4 and 5. To obtain the total future context for module 600, the input frames 1, 2, 3, 4, 5 can be shifted by shift 604 by 2 frames and summed with context output from the Conv1D 602 in block 606.

In some embodiments, the future context can be determined as a maximum of sums of context in any sequential path within the module, submodule or neural network. For example, the residual block module has a residual connection of a convolution layer with two sequential operations, where the first operation is convolution with future context x, and the second operation is residual summation of inputs to convolution layer to output. There are two sequential paths from inputs to outputs in such a module, the first path: inputs→conv→add→output, and the second path: inputs→add→output. If the sequential path with the maximum sum of future contexts is the first path, then the total future context equals x.

Technical Details

1) In some embodiments, the speech audio signal 202 can include a continuous stream of 16-bit samples with a frequency of 22050 kHz. The speech audio signal 202 can be split into overlapping windows with a step of 256 samples (~11.6 ms). Accordingly, one frame corresponds to 256 samples.

The acoustic features and linguistic features can be extracted and calculated such that the centers of the windows that correspond to each feature coincide. Thus, the centers can point to the same moment in time to satisfy the condition of alignment of the features. Accordingly, when the synthesis module 800 processes the input, the number of frames from each feature is the same. The number of frames in the output melspectrogram 204 may also coincide with the number of frames from each feature. Consequently, the number of samples of the speech audio signal 202 (input signal) can be equal to the number of samples of output audio signal 308.

Figure 7:
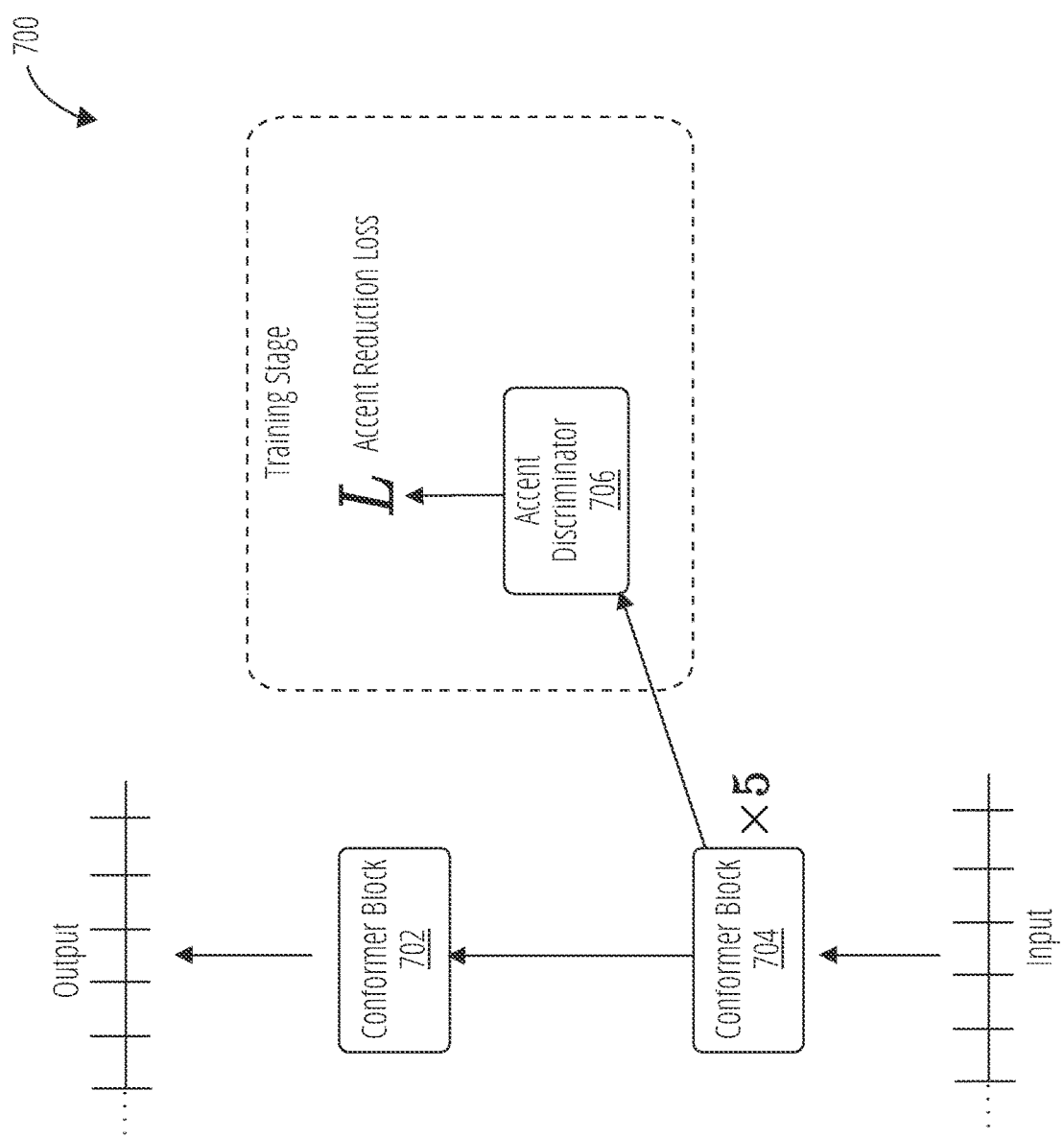
FIG. 7 shows a part of an example neural network trained to generate linguistic accent-agnostic features, according to an example embedment.

2) FIG. 7 shows a part of an example neural network 700 trained to generate accent-agnostic PPGs. The neural network 700 may include Conformer blocks 704 and Conformer block 702. The Conformer is a convolution-augmented transformer for speech recognition. Each of the Conformer blocks can be implemented with restrictions on attention and the convolutional layer on visible future frames and previous frames. Neural network 700 trained to generate PPGs may also include a linear head for predicting phonemes.

The neural network 700 can be trained using an accent discriminator 706 and supervised information for accent. During training, additional feed-forward network (FFN) can be used between transformer blocks of neural network 700. Output features from FFN and supervised label on accent can be utilized for additional accent reduction loss L. Training with the additional accent reduction loss may reduce leak of accent through the recognition model. In example of FIG. 7, output of the fifth Conformer block 704 can be utilized to produce additional features by simple feed-forward network (for example linear-Rectified Linear Unit (ReLU)-linear). These features can be utilized for accent reduction loss based on data labels indicating which accent is used on every utterance. Use of the accent reduction loss during training may help to produce accent agnostic features). "Cross-entropy classification loss with reversal gradients module" for the accent reduction loss.

During inference, an output (target) accent can be selected from accents available on training stage. During the training stage, datasets of different voices and accents can be used. Any of the datasets can be validated for appropriate sound quality and then used for output target voice and accent.

3) Extraction of acoustic features (pitch 206 (F0), energy 208, or VAD 212) can be performed by algorithmic methods using sound processing tools or by trained neural networks. The following algorithmic methods and utilities may be applied:

Energy 208: Short-time Fourier transform (STFT) followed by a summation over all frequency bins and applying a logarithm to the result of the summation.

Pitch 206 (F0) and VAD 212: values of F0 and voiced/unvoiced intervals can be obtained using the pyWORLD script. pyWORLD is a free software for high-quality speech analysis, manipulation and synthesis. The pyWORLD can estimate fundamental frequency (F0), aperiodicity, and spectral envelope. The values of F0 can be interpolated to unvoiced intervals. Then, the logarithm can be applied to resulting F0.

Energy 208 and Pitch 206 (F0) can also be normalized globally using average variance of corresponding values obtained from voice signals recorded from multiple speakers.

Figure 8:
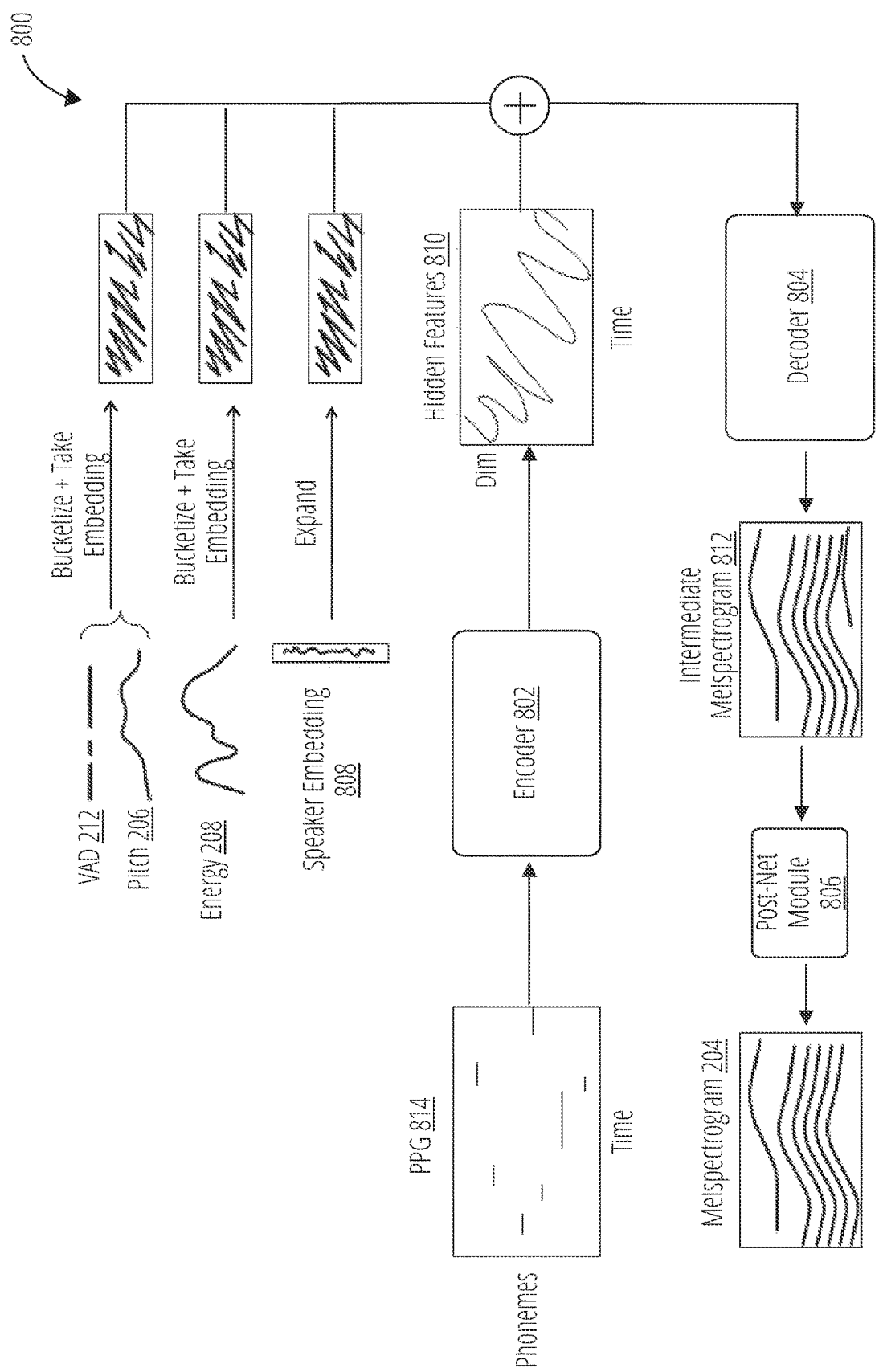
FIG. 8 is a block diagram showing blocks of a synthesis module, according to an example embodiment.

FIG. 8 is a block diagram showing blocks of the synthesis module 800, according to an example embodiment. The synthesis module 800 may include an encoder 802 and decoder 804. In some embodiments, encoder 802 and decoder 804 can be implemented as neural networks. Specifically, both encoder 802 and decoder 804 can be based on lightweight convolution blocks. A convolutional layer (Conv1d-Groupnorm-GELU) acting as relative positional embedding can be applied to input of the encoder 802. In some embodiments, relative positional embedding is added to the input inside the encoder 802. A further convolutional layer (Conv1d-Groupnorm-GELU) acting as further relative positional embedding can be applied to input of the decoder 804. In some embodiments, the further relative positional embedding is added to the input of the decoder 804.

The input of the encoder 802 are linguistic features 210. The output of the encoder 802 has hidden features 810. The speaker embedding 808 of a target speaker and embeddings of the discretized values of energy 208 and pitch 206 (f0) are further added to the output of the encoder 802 to form input for the decoder 804. If VAD 212=False, a separate embedding is used instead of embedding of pitch 206 (F0). Speaker embedding 808 can be a calculated feature in the form of a dense multi-dimensional vector. Speaker embeddings 808 may include necessary information on target speakers' voice style not related to the accent of the target speaker.

In various embodiments, speaker embedding 808 can be trained fixed, pre-trained fixed, or extracted via a pre-trained model from speech audio signal 202 in real-time. For example, the speaker embedding 808 can be trained or extracted using pre-trained algorithms in such a way that the voice acoustic features corresponding to the speaker embedding 808 match voice acoustic features of the target speaker. In these embodiments, the speaker embedding 808 can be pretrained based on audio data including recorded speech of the target speaker. The user 102 may be provided with an option to select speaker embedding 808 form a list of pretrained speaker embeddings corresponding to different speakers.

In other embodiments, the voice speaker embedding 808 can be generated in real-time based on speech audio signal 202 being recorded from the voice of the user 102. In these embodiments, a caching scheme similar to the caching scheme described in FIG. 4 can be used to extract the speaker embedding 808 from speech audio signal 202 in real-time. The speaker embedding 808 can be used later to produce output audio signal 308 having voice acoustic features of the user 102.

In yet other embodiments, the speaker embedding 808 can be pre-generated based on previously recorded speech signals of the user 102 and stored in memory of the computing device 106 or computing cloud 112. In these embodiments, the speaker embedding 808 can be retrieved from the memory computing device 106 or computing cloud 112 to avoid recomputing the speaker embedding 808 in real-time.

The output of decoder 804 is an intermediate melspectrogram 812. The intermediate melspectrogram 812 is used in a post-net module 806 to output melspectrogram 210. The post-net module 806 can be implemented as a small convolutional network. In some embodiments, the post-net module 806 can be similar to a post-net used in Tacotron 2. The values of VAD 212, Energy 208, and pitch 206 can be the same as acoustic features extracted by acoustic features extraction module 302 (shown in FIG. 3) or predicted by separate modules of the synthesis module 800. All blocks of encoder 802 and decoder 804, as well as predictors, the relative positional encoding layer, and the post-net module 806 can be implemented with a limited future context.

The output of the post-net module 806 is provided to vocoder 306. In some embodiments, the vocoder 306 can correspond to the HiFi-GAN v2 or LPCNet vocoder without changes. The vocoder parameters may correspond to the synthesis of the audio signal for the frames of the melspectrogram.

Data

For PPG. Medium-quality voice data of various accents with the presence of texts are available in datasets of LibriSpeech and CommonVoice. The texts can be normalized and processed to obtain phoneme sequences according to ARPAbet phoneme set. Next, the procedure of alignment (align) of phonemes in time can be performed using the Montreal-Forced-Aligner utility. The image of texts can be processed by grapheme-to-phoneme (g2p) to obtain phonemes. Then, the phonemes can be processed and aligned together with audio signal.

For the vocoder. The VCTK dataset is used for pre-training and, similarly to the data for synthesis, pure data from the same speakers that were not used to train the synthesis model. These data are resynthesized to melspectrograms. The melspectrograms can then be used together with the original pure audio to retrain the vocoder.

Training

In some embodiments, the PPG model is trained in two stages: pre-training and additional training. A set of augmentations, such as noise and SpecAugment can be used in both stages.

Pre-training.

Pre-training of the PPG model can be performed in an unsupervised manner and using clustering. Specifically, Mel-frequency cepstral coefficients (Mfcc) or hidden features of large ASR neural networks can be algorithmically divided into clusters using k-means. Each frame can be assigned to a specific cluster (by a number). Pre-training includes training the PPG model with a classification head to obtain the number of the cluster for a frame. The last hidden layer of features of the PPG model can be clustered (like mfcc) and used for training an improved PPG model. This procedure can be applied iteratively.

Additional training of the PPG model is carried out on connectionist temporal classification loss (recognition task) by phoneme sequence and cross-entropy loss (classification task) by phoneme prediction in each frame. To do this, two appropriate heads can be used on top of the encoder in the PPG model. As described in FIG. 7, additional training of PPG model can be performed using loss for accent reduction. In these embodiments, the training can be performed by providing output of one of intermediate blocks of the PPG model to an accent discriminator with reversal gradient using accent classification loss function, which may play the role of accent loss function (see blocks 704 and 706 in FIG. 7).

The synthesis model can be trained on predictions of acoustic values in predictors of values of the output mel-spectrogram after the decoder and after the post-network. The predictors may include mean squared error (mse) loss according to energy and f0 predictions and binary cross entropy loss according to VAD prediction. For the synthesis model, output speaker embeddings can be trained as parameters which lead to a fixed number of available output speaker embeddings. In other embodiments, the output speaker embeddings can be obtained as hidden features of a pre-trained speaker classification model applied in streaming manner to input speech data in order to perceive input speaker voice.

Vocoder can be trained in two stages: training on a large multiple speaker dataset and additional training on resynthesis with the help of the already trained part of the pipeline 300. The optimization methods (training methods) can be combined to train described models jointly. During joint training, a single audio sample can be used for every loss function calculation and every parameter update.

Streaming

Figure 9:
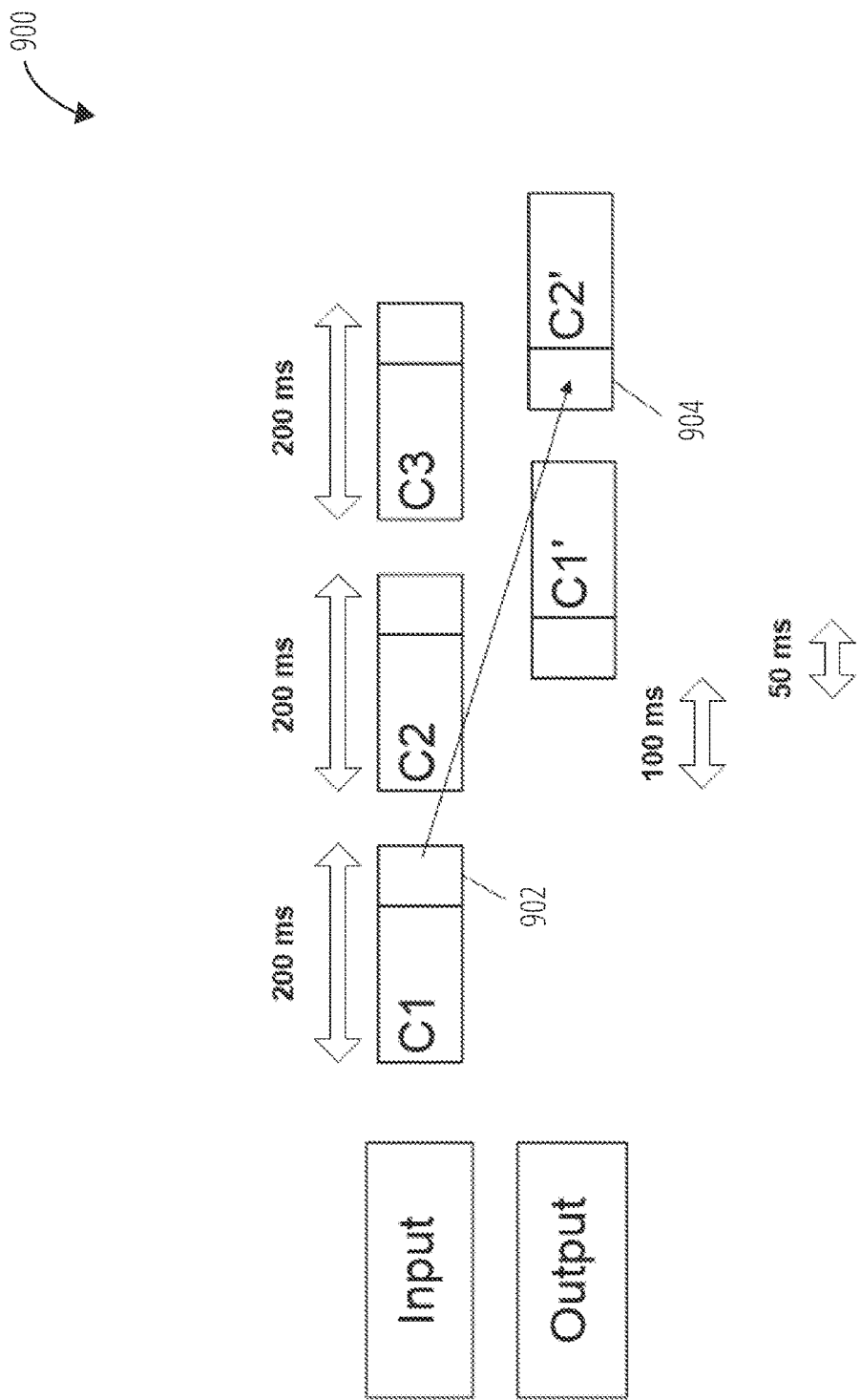
FIG. 9 is a schematic showing details of streaming of a speech audio signal, according to some example embodiment.

FIG. 9 is a schematic showing details of streaming of a speech audio signal, according to some example embodiment.

The speech audio signal can be processed in chunks. A chunk may correspond to a certain window, typically, 3~10 frames=3*256~10*256 samples=35~116 ms. Each module in pipeline 300 processes the chunk and outputs a result corresponding to the size of the input chunk.

In accordance with architectures of modules (feature extraction, synthesis, vocoding), an appropriate number of frames/samples can be cut off (modularly or at the output) to obtain a high-quality result with a low latency. The number of frames/samples can be defined as the total number of frames/samples from the front of the signal.

The streaming delay can be defined as the time difference between the original moment of speech and the output corresponding to the original one. The streaming delay includes the following components:

Architectural delay. This delay is embedded in the indentation to account for a larger future context and thereby improving the processing quality of each module in the pipeline.

The size of the chunk. The size of the chunk affects time for waiting for all the data before processing because the modules cannot output the result until the data are obtained by the modules.

Processing time. The processing time is a time within which the chunk is completely processed by modules in the pipeline 300. The processing time needed to be adjusted to ensure a stable conversion of input chunks into output chunks.

In the example of FIG. 9, the size of the chunk is 200 ms, maximum processing time is 100 ms, and the architecture delay is 50 ms. The total delay is 350 ms. The chunks C1, C2, C3, ... are fed into the pipeline 300 in real time. Each output chunk C1', C2', ... correspond to only one of the input chunk C1, C2, C3, .... portion 904 of output audio signal 308 corresponds to portion 902 of input speech audio signal 202. Portion 902 and portion 904 correspond to the same moment of the speech of the user 102. Overall, according to experiments conducted by the inventors, the methods of the present disclosure allow to achieve the total delay of 40-300 ms.

Figure 10:
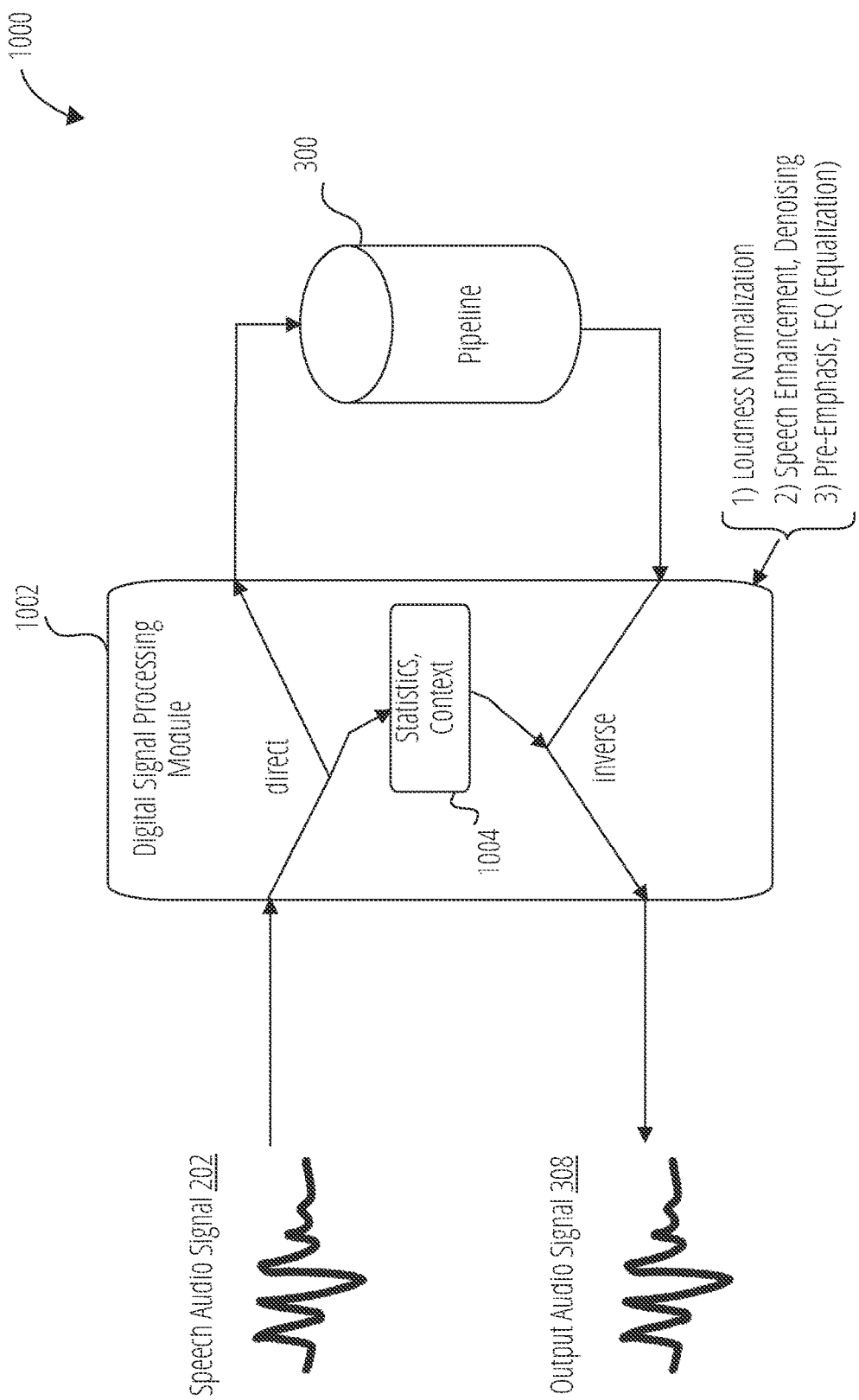
FIG. 10 is a block diagram showing a digital signal processing module for use with a system for real-time correction of accent in speech audio signals, according to some example embodiments.

FIG. 10 is a block diagram 1000 showing a digital signal processing module 1002 for use with pipeline 300 for real-time correction of accent in speech audio signals, according to some example embodiments. The digital signal processing module 1002 can be used for enhancement of speech audio signal 202 and output audio signal 308. The digital signal processing module 1002 may include submodule 1004 for collecting and storing statistics and context during processing speech audio signal 202. The processed speech audio signal 202 can be further provided to pipeline 300 for correction of accent. The output of the pipeline 300 can be processed by digital signal processing module 1002 to obtain an output audio signal 308. During processing the output of pipeline 300 the digital signal processing module 1002 can utilize statistics and context collected by submodule 1004 to restore some characteristics removed from the speech audio signal.

In some embodiments, digital signal processing module 1002 may process speech audio signal 202 to remove or attenuate noise, cancel echo, and remove other artifacts. Digital signal processing module 1002 may also perform normalization of loudness of the signal, equalizing the signal, applying a pre-emphasis or de-emphasis to the signal, and enhancing a speech in the signal. In certain embodiments, digital signal processing module 1002 can be integrated in one of the modules of the pipeline 300 as a beginning submodule or inserted between any two modules of the pipeline 300. In these embodiments, digital signal processing module 1002 can be trained with corresponding losses to imitate digital signal processing algorithms.

In some embodiments, digital signal processing module 1002 can be used to control loudness of output audio signal 308. For example, digital signal processing module 1002 may auto-gain loudness of speech audio signal 202 before pipeline 300 processing and then, based on a user setting, restore or not to restore level of loudness of output audio signal 308 to corresponding level of loudness of speech audio signal 202.

Figure 11:
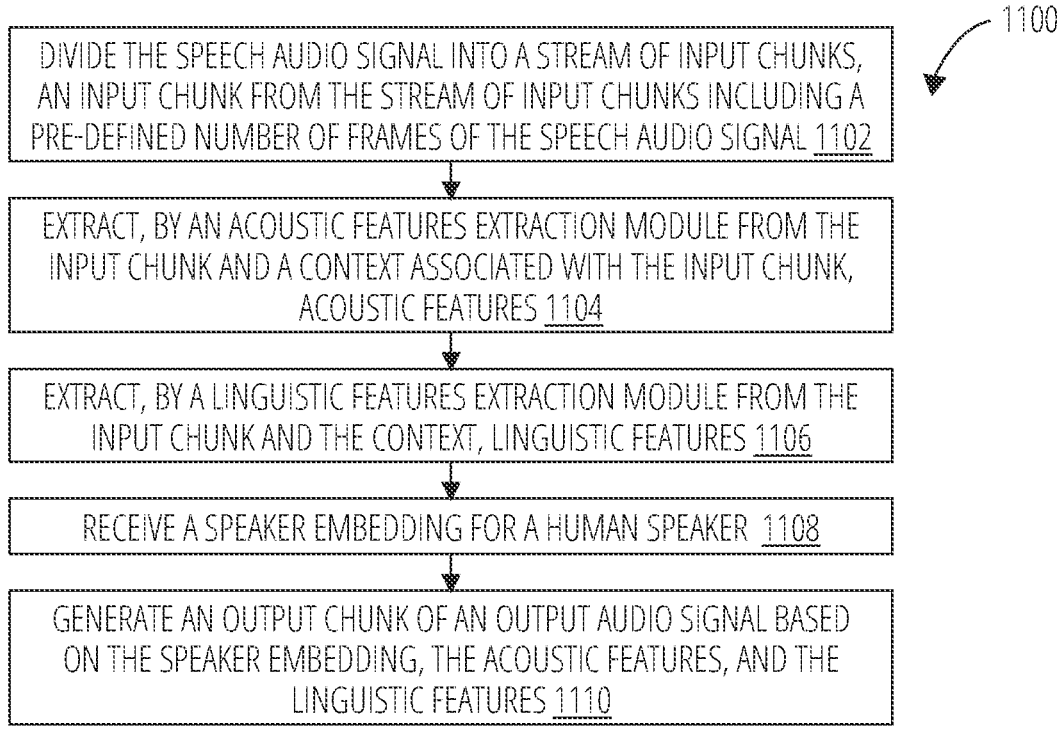
FIG. 11 is a flow chart showing a method 1100 for real-time correction of accent in speech audio signals, according to some example embodiments.

FIG. 11 is a flow chart showing a method 1100 for real-time correction of accent in speech audio signals, according to some example embodiments. In some embodiments, the operations of method 1100 may be combined, performed in parallel, or performed in a different order. The method 1100 may also include additional or fewer operations than those illustrated. The method 1100 may be performed by processing logic that comprises hardware (e.g., decision making logic, dedicated logic, programmable logic, and microcode), software (such as software run on a general-purpose computer system or a dedicated machine), or a combination of both.

In block 1102, method 1100 may divide the speech audio signal into a stream of input chunks, an input chunk from the stream of input chunks including a pre-defined number of frames of the speech audio signal. The speech audio signal can be recorded, via an acoustic sensor, from the voice of a user by a computing device implementing method 1100.

In block 1104, method 1100 may extract, by an acoustic features extraction module from the input chunk and a context associated with the input chunk, acoustic features. The context may include a pre-determined number of the frames belonging to chunks preceding the input chunk in the stream of input chunks. The acoustic features may include a pitch of the speech audio signal, an energy of the speech audio signal, and a value of a voice activity detector. The voice activity detector may indicate absence of a human voice in the speech audio signal or presence of the human voice in the speech audio signal.

In block 1106, method 1100 may extract, by a linguistic features extraction module from the input chunk and the context, linguistic features with a reduced accent or accent-agnostic linguistic features. The linguistic features extraction module may include a neural network trained based on audio data to output the linguistic features, neural network being trained using a loss function to reduce, in the linguistic features, contributions due to a further accent present in the audio data. The linguistic features may include one of the following: phonetic posteriorgrams or phonetic posteriorgrams with a data-driven phonetic library.

In block 1108, method 1100 may receive a speaker embedding for a human speaker. The speaker embedding can be pretrained based on audio data including a recorded speech of a target speaker having a further accent. Alternatively, the speaker embedding can be generated based on the speech audio signal in real-time.

In block 1110, method 1100 may generate an output chunk of an output audio signal based on the speaker embedding, the acoustic features, and the linguistic features. For example, method 1100 may provide the speaker embedding, the acoustic features, and the linguistic features to a synthesis module to generate a melspectrogram with the reduced accent. The synthesis module may include an encoder, a decoder, and a post-net module designed to improve the output of the decoder. Generating the melspectrogram may include processing the linguistic features by the encoder to generate hidden features; combining the hidden features, the acoustic features, and the speaker embeddings to generate further features; processing the further features by the decoder and the post-net module to generate the melspectrogram.

After generating the melspectrogram, method 1100 may provide the melspectrogram to a vocoder to generate an output chunk of an output audio signal. A delay between the first timestamp corresponding to the time when the chunk of the speech audio signal is recorded and the second timestamp corresponding to the time when the output chunk is generated can be between 40 ms and 300 ms.

The acoustic features can be split into a stream of acoustic features chunks corresponding to the chunks in the stream of input chunks. The linguistic features can be split into a stream of linguistic features chunks corresponding to the chunks in the stream of input chunks. The melspectrogram can be split into a stream of melspectrogram chunks corresponding to the chunks in the stream of input chunks. A melspectrogram chunk of the stream of melspectrogram chunks is generated based on the following:

an acoustic features chunk of the stream of acoustic features chunks and acoustic features context including the pre-determined number of acoustic features frames belonging to acoustic features chunks preceding the acoustic features chunk in the stream of acoustic features chunks; and a linguistic features chunk of the stream of melspectrogram chunks and linguistic features context including the pre-determined number of linguistic features frames belonging to linguistic features chunks preceding the linguistic features chunk in the stream of acoustic features chunks.

The method 1100 may include, prior to dividing the speech audio signal, processing the speech audio signal by a digital signal processing module to adjust one or more characteristics of the speech audio signal to improve extraction of the linguistic features and the acoustic features.

The method 1100 may include, prior to dividing the speech audio signal, processing the speech audio signal by a digital signal processing module to adjust a loudness of the speech audio signal from a first level to a second level. Method 1100 may include, after generating the output chunk of the output audio signal, processing the output chunk by the digital signal processing module, to adjust the loudness of the output audio signal to the first level.

Figure 12:
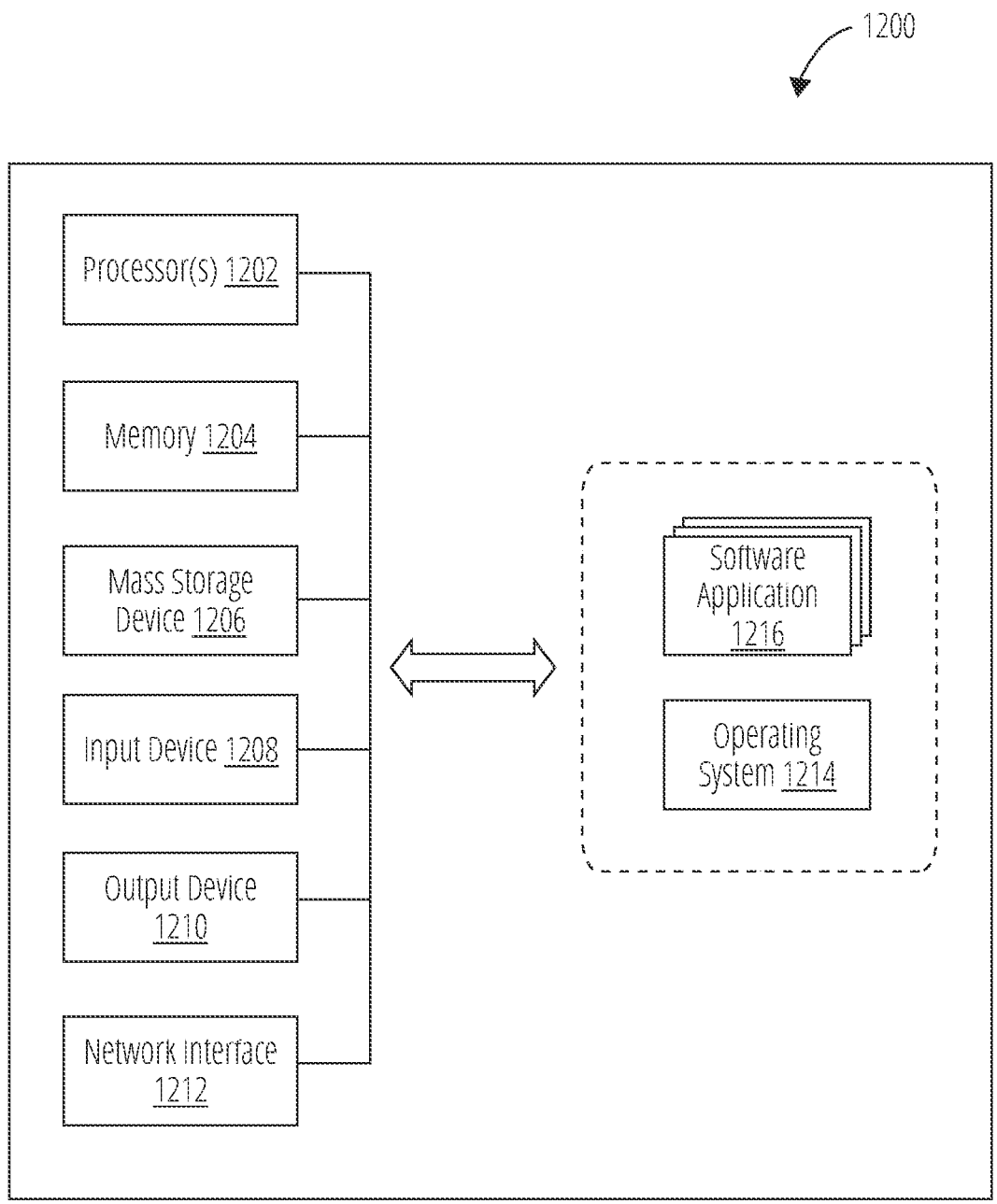
FIG. 12 is a high-level block diagram illustrating an example computer system, within which a set of instructions for causing the machine to perform any one or more of the methodologies discussed herein can be executed.

FIG. 12 is a high-level block diagram illustrating an example computer system 1200, within which a set of instructions for causing the machine to perform any one or more of the methodologies discussed herein can be executed. The computer system 1200 may include, refer to, or be an integral part of, one or more of a variety of types of devices, such as a general-purpose computer, a desktop computer, a laptop computer, a tablet computer, a netbook, a mobile phone, a smartphone, a personal digital computer, a smart television device, and a server, among others. In some embodiments, the computer system 1200 is an example of computing devices 106, computing device 110, and computing cloud 112 shown in FIG. 1. Notably, FIG. 12 illustrates just one example of the computer system 1200 and, in some embodiments, the computer system 1200 may have fewer elements/modules than shown in FIG. 12 or more elements/modules than shown in FIG. 12.

The computer system 1200 may include one or more processor(s) 1202, a memory 1204, one or more mass storage devices 1206, one or more input devices 1208, one or more output devices 1210, and a network interface 1212. The processor(s) 1202 are, in some examples, configured to implement functionality and/or process instructions for execution within the computer system 1200. For example, the processor(s) 1202 may process instructions stored in the memory 1204 and/or instructions stored on the mass storage devices 1206. Such instructions may include components of an operating system 1214 or software applications 1216. The computer system 1200 may also include one or more additional components not shown in FIG. 12, such as a body, a power supply, a power supply, a global positioning system (GPS) receiver, and so forth.

Memory 1204, according to one example, is configured to store information within the computer system 1200 during operation. The memory 1204, in some example embodiments, may refer to a non-transitory computer-readable storage medium or a computer-readable storage device. In some examples, memory 1204 is a temporary memory, meaning that a primary purpose of the memory 1204 may not be long-term storage. Memory 1204 may also refer to a volatile memory, meaning that memory 1204 does not maintain stored contents when the memory 1204 is not receiving power. Examples of volatile memories include random access memories (RAM), dynamic random access memories (DRAM), static random access memories (SRAM), and other forms of volatile memories known in the art. In some examples, memory 1204 is used to store program instructions for execution by the processor(s) 1202. The memory 1204, in one example, is used by software (e.g., the operating system 1214 or the software applications 1216). Generally, the software applications 1216 refer to software Applications suitable for implementing at least some operations of the methods for real-time correction of accent in speech audio signals as described herein.

The mass storage devices 1206 may include one or more transitory or non-transitory computer-readable storage media and/or computer-readable storage devices. In some embodiments, the mass storage devices 1206 may be configured to store greater amounts of information than the memory 1204. The mass storage devices 1206 may further be configured for long-term storage of information. In some examples, the mass storage devices 1206 include non-volatile storage elements. Examples of such non-volatile storage elements include magnetic hard discs, optical discs, solid-state discs, flash memories, forms of electrically programmable memories (EPROM) or electrically erasable and programmable memories, and other forms of non-volatile memories known in the art.

Input devices 1208, in some examples, may be configured to receive input from a user through tactile, audio, video, or biometric channels. Examples of the input devices 1208 may include a keyboard, a keypad, a mouse, a trackball, a touchscreen, a touchpad, a microphone, one or more video cameras, image sensors, fingerprint sensors, or any other device capable of detecting an input from a user or other source, and relaying the input to the computer system 1200, or components thereof.

The output devices 1210, in some examples, may be configured to provide output to a user through visual or auditory channels. The output devices 1210 may include a video graphics adapter card, a liquid crystal display (LCD) monitor, a light emitting diode (LED) monitor, an organic LED monitor, a sound card, a speaker, a lighting device, a LED, a projector, or any other device capable of generating output that may be intelligible to a user. The output devices 1210 may also include a touchscreen, a presence-sensitive display, or other input/output capable displays known in the art.

The network interface 1212 of the computer system 1200, in some example embodiments, can be utilized to communicate with external devices via one or more data networks such as one or more wired, wireless, or optical networks including, for example, the Internet, intranet, LAN, WAN, cellular phone networks, Bluetooth radio, and an IEEE 902.11-based radio frequency network, Wi-Fi networks®, among others. The network interface 1212 may be a network interface card, such as an Ethernet card, an optical transceiver, a radio frequency transceiver, or any other type of device that can send and receive information.

The operating system 1214 may control one or more functionalities of the computer system 1200 and/or components thereof. For example, the operating system 1214 may interact with the software applications 1216 and may facilitate one or more interactions between the software applications 1216 and components of the computer system 1200. As shown in FIG. 12, the operating system 1214 may interact with or be otherwise coupled to the software applications 1216 and components thereof. In some embodiments, the software applications 1216 may be included in the operating system 1214. In these and other examples, virtual modules, firmware, or software may be part of software applications 1216.

Thus, systems and methods for real-time correction of accent in speech audio signals have been described. Although embodiments have been described with reference to specific example embodiments, it will be evident that various modifications and changes can be made to these example embodiments without departing from the broader spirit and scope of the present Application. Accordingly, the specification and drawings are to be regarded in an illustrative rather than a restrictive sense.

What is claimed is:

1. A method for real-time correction of an accent in a speech audio signal, the method being implemented by a computing device and comprising:
dividing the speech audio signal into a stream of input chunks, an input chunk from the stream of input chunks including a pre-defined number of frames of the speech audio signal;
extracting, by an acoustic features extraction module from the input chunk and a context associated with the input chunk, acoustic features;
extracting, by a linguistic features extraction module from the input chunk and the context, linguistic features with a reduced accent;
receiving a speaker embedding for a human speaker; and
generating an output chunk of an output audio signal based on the speaker embedding, the acoustic features, and the linguistic features.

2. The method for real-time correction of claim 1, wherein:
the speech audio signal is recorded from a voice of a user by the computing device via an acoustic sensor; and
a delay between a first timestamp and a second timestamp is between 40 milliseconds and 300 milliseconds, wherein the first timestamp corresponds to a time when the chunk of the speech audio signal is recorded and the second timestamp corresponds to a time when the output chunk is generated.

3. The method for real-time correction of claim 1, wherein the speaker embedding is generated based on the speech audio signal.

4. The method for real-time correction of claim 1, wherein the speaker embedding is pretrained based on audio data including a recorded speech of a target speaker having a further accent.

5. The method for real-time correction of claim 1, wherein the linguistic features include one of the following: phonetic posteriorgrams with a standardized phonetic dictionary and phonetic posteriorgrams with a data-driven phonetic library.

6. The method for real-time correction of claim 1, wherein the linguistic features extraction module includes a neural network trained based on audio data to output the linguistic features with the reduced accent, the neural network being trained using a loss function to reduce, in the linguistic features, contributions due to a further accent present in the audio data.

7. The method for real-time correction of claim 1, wherein the acoustic features include a pitch of the speech audio signal, an energy of the speech audio signal, and a value of a voice activity detector, the voice activity detector indicating absence of a human voice in the speech audio signal or presence of the human voice in the speech audio signal.

8. The method for real-time correction of claim 1, wherein the context is a pre-determined number of the frames belonging to chunks preceding the input chunk in the stream of input chunks.

9. The method for real-time correction of claim 1, wherein the generating the output chunk includes:
providing the speaker embedding, the acoustic features, and the linguistic features to a synthesis module to generate a melspectrogram with the reduced accent; and
providing the melspectrogram to a vocoder to generate the output chunk of the output audio signal.

10. The method for real-time correction of claim 9, wherein:
the synthesis module includes an encoder, a decoder, and a post-net module designed to improve an output of the decoder; and
generating the melspectrogram includes:
processing the linguistic features with the reduced accent by the encoder to generate hidden features;
combining the hidden features, the acoustic features, and the speaker embeddings to generate further features;
processing the further features by the decoder and the post-net module to generate the melspectrogram.

11. The method for real-time correction of claim 10, wherein:
the acoustic features are split into a stream of acoustic features chunks corresponding to the chunks in the stream of input chunks;
the linguistic features are split into a stream of linguistic features chunks corresponding to the chunks in the stream of input chunks;
the melspectrogram is split into a stream of melspectrogram chunks corresponding to the chunks in the stream of input chunks; and
a melspectrogram chunk of the stream of melspectrogram chunks is generated based on the following:
an acoustic features chunk of the stream of acoustic features chunks and acoustic features context including the pre-determined number of acoustic features frames belonging to acoustic features chunks preceding the acoustic features chunk in the stream of acoustic features chunks; and
a linguistic features chunk of the stream of melspectrogram chunks and linguistic features context including the pre-determined number of linguistic features frames belonging to linguistic features chunks preceding the linguistic features chunk in the stream of acoustic features chunks.

12. The method for real-time correction of claim 1, further comprising, prior to dividing the speech audio signal, processing the speech audio signal by a digital signal processing module to adjust one or more characteristics of the speech audio signal to improve extraction of the linguistic features and the acoustic features.

13. The method for real-time correction of claim 1, further comprising:
prior to dividing the speech audio signal, processing the speech audio signal by a digital signal processing module to adjust a loudness of the speech audio signal from a first level to a second level;
after generating the output chunk of the output audio signal, processing the output chunk by the digital signal processing module, to adjust the loudness of the output audio signal to the first level.

14. A computing apparatus comprising:
a processor; and
a memory storing instructions that, when executed by the processor, configure the apparatus to:
divide a speech audio signal including an accent into a stream of input chunks, an input chunk from the stream of input chunks including a pre-defined number of frames of the speech audio signal;
extract, by an acoustic features extraction module from the input chunk and a context associated with the input chunk, acoustic features;
extract, by a linguistic features extraction module from the input chunk and the context, linguistic features with a reduced accent;
receive a speaker embedding for a human speaker; and
generate an output chunk of an output audio signal based on the speaker embedding, the acoustic features, and the linguistic features.

15. The computing apparatus of claim 14, wherein:
the speech audio signal is recorded from a voice of a user by the computing apparatus via an acoustic sensor; and
a delay between a first timestamp and a second timestamp is between 40 milliseconds and 300 milliseconds, wherein the first timestamp corresponds to a time when the chunk of the speech audio signal is recorded and the second timestamp corresponds to a time when the output chunk is generated.

16. The computing apparatus of claim 14, wherein the speaker embedding is generated based on the speech audio signal.

17. The computing apparatus of claim 14, wherein the speaker embedding is pretrained based on audio data including a recorded speech of a target speaker having a further accent.

18. The computing apparatus of claim 14, wherein:
the linguistic features include one of the following: phonetic posteriorgrams with a standardized phonetic dictionary and phonetic posteriorgrams with a data-driven phonetic library; and
the acoustic features include a pitch of the speech audio signal, an energy of the speech audio signal, and a value of a voice activity detector, the voice activity detector indicating absence of a human voice in the speech audio signal or presence of the human voice in the speech audio signal.

19. The computing apparatus of claim 14, wherein the linguistic features extraction module includes a neural network trained based on audio data to output the linguistic features with the reduced accent, the neural network being trained using a loss function to reduce, in the linguistic features, contributions due to a further accent present in the audio data.

20. A non-transitory computer-readable storage medium, the computer-readable storage medium including instructions that when executed by a computer, cause the computer to:
divide a speech audio signal including an accent into a stream of input chunks, an input chunk from the stream of input chunks including a pre-defined number of frames of the speech audio signal;
extract, by an acoustic features extraction module from the input chunk and a context associated with the input chunk, acoustic features;
extract, by a linguistic features extraction module from the input chunk and the context, linguistic features with a reduced accent;
receive a speaker embedding for a human speaker; and generate an output chunk of an output audio signal based on the speaker embedding, the acoustic features, and the linguistic features.

* * * * *